(12) United States Patent
Kudo

(10) Patent No.: US 12,266,518 B2
(45) Date of Patent: Apr. 1, 2025

(54) ION ANALYZER

(71) Applicant: SHIMADZU CORPORATION, Kyoto (JP)

(72) Inventor: Tomoya Kudo, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 373 days.

(21) Appl. No.: 17/925,177

(22) PCT Filed: May 20, 2020

(86) PCT No.: PCT/JP2020/019907
§ 371 (c)(1),
(2) Date: Nov. 14, 2022

(87) PCT Pub. No.: WO2021/234846
PCT Pub. Date: Nov. 25, 2021

(65) Prior Publication Data
US 2023/0170199 A1 Jun. 1, 2023

(51) Int. Cl.
*H01J 49/02* (2006.01)
*H01J 49/06* (2006.01)
*H01J 49/16* (2006.01)
*H01J 49/42* (2006.01)

(52) U.S. Cl.
CPC .......... *H01J 49/025* (2013.01); *H01J 49/062* (2013.01); *H01J 49/068* (2013.01); *H01J 49/168* (2013.01); *H01J 49/4215* (2013.01)

(58) Field of Classification Search
USPC ...................................................... 250/288
See application file for complete search history.

(56) References Cited

U.S. PATENT DOCUMENTS

| 6,686,592 | B1* | 2/2004 | Sakairi | H01J 49/0422 250/324 |
| 2004/0089802 | A1* | 5/2004 | Kato | H01J 49/0045 250/288 |
| 2019/0252178 | A1 | 8/2019 | Nishiguchi | |

FOREIGN PATENT DOCUMENTS

WO 2018/078693 A1 5/2018

OTHER PUBLICATIONS

Written Opinion of PCT/JP2020/019907 dated Aug. 18, 2020 [PCT/ISA/237].

(Continued)

*Primary Examiner* — Kiet T Nguyen
(74) *Attorney, Agent, or Firm* — Sughrue Mion, PLLC

(57) ABSTRACT

An ion analyzer including: a base member fixed to a ion outflow port and having a cylindrical concave part; a cylindrical first conductive member accommodated in the concave part; a first ion flow controller fixed to an exposed end of the first conductive member; a cylindrical insulating member inserted into the first conductive member; a rod-shaped second conductive member inserted into the insulating member; a second ion flow controller being fixed to an exposed end of the second conductive member; a first power feeding unit that, when accommodated in the concave part, comes into contact with the first conductive member; and a second power feeding unit that, when accommodated in the concave part, comes into contact with the second conductive member when the first conductive member accommodates the second conductive member and the insulating member.

10 Claims, 8 Drawing Sheets

(56) References Cited

OTHER PUBLICATIONS

International Search Report of PCT/JP2020/019907 dated Aug. 18, 2020 [PCT/ISA/210].
Office Action dated May 9, 2023 from the Japanese Patent Office in Application No. 2022-524748.
Office Action issued Apr. 17, 2024 in Chinese Application No. 202080098698.9.

* cited by examiner

ION ANALYZER

CROSS REFERENCE TO RELATED APPLICATIONS

This application is a National Stage of International Application No. PCT/JP2020/019907 filed on May 20, 2020.

TECHNICAL FIELD

The present invention relates to an ion analyzer.

BACKGROUND ART

One of devices for analyzing a substance contained in a liquid sample is a liquid chromatograph mass spectrometer. In the liquid chromatograph mass spectrometer, a liquid sample is introduced into a column of a liquid chromatograph on a flow of a mobile phase, and a target substance is separated from other substances inside the column. The target substance flowing out of the column is ionized by an ion source of the mass spectrometer, and then separated according to the mass-to-charge ratio in a mass spectrometry section and measured.

As an ion source of the mass spectrometer, for example, an electrospray ionization (ESI) source is used. The ESI source is one of atmospheric pressure ion sources that ionize a target substance in an atmospheric pressure atmosphere. In the ESI source, the liquid sample is charged, and the charged liquid sample is sprayed with a nebulizer gas and is nebulized in the ionization chamber. The charged droplets nebulized in the ionization chamber are split due to charge repulsion inside the droplets and vaporization (desolvation) of the mobile phase creates ions.

In the mass spectrometer, when a droplet containing a large amount of neutral molecules and the like derived from a mobile phase enters a mass spectrometry section, the mass spectrometry section is contaminated. Therefore, in many ESI sources, an arrangement of an ionization probe and an ion introduction unit is determined such that a direction in which charged droplets are sprayed from the ionization probe and a direction in which ions are introduced from the ionization chamber into the mass spectrometry section are orthogonal to each other. Ions generated by desolvation of the droplets in the ionization chamber are taken into the mass spectrometry section on a gas flow generated by a differential pressure between the ionization chamber at atmospheric pressure and the mass spectrometry section at vacuum.

Patent Literature 1 describes a configuration for enhancing an intake efficiency of ions into a mass spectrometry section in an atmospheric pressure ion source such as an ESI source. The atmospheric pressure ion source includes a convergence electrode having an opening surrounding an ion intake port from the ionization chamber to the mass spectrometry section, and a push electrode disposed on an opposite side of the convergence electrode with a jet from the ionization probe interposed between the push electrode and the convergence electrode. A first voltage having the same polarity as that of the ion to be measured is applied to the push electrode. Further, a second voltage having the same polarity as that of the ion to be measured and having an absolute value smaller than that of the first voltage is applied to the convergence electrode. Ions contained in the jet emitted from the ionization probe are pushed toward the convergence electrode by a potential gradient from the push electrode toward the convergence electrode, and in the vicinity of the convergence electrode, the ions are converged to the ion intake port by a potential gradient from the convergence electrode toward the ion intake port. On the other hand, neutral molecules are not affected by the potential gradient. Therefore, it is possible to enhance the intake efficiency of ions derived from the target substance while suppressing the neutral molecules derived from the mobile phase or the like from entering the mass spectrometry section, contaminating the mass spectrometry section, and lowering an analysis accuracy of the target substance.

CITATION LIST

Patent Literature

Patent Literature 1: WO 2018/078693 A

SUMMARY OF INVENTION

Technical Problem

Although Patent Literature 1 describes that the push electrode and the convergence electrode are disposed in the ionization chamber, a specific method of actually fixing these electrodes in the ionization chamber is not described. When analysis of the liquid sample is repeated, dirts tend to adhere to surfaces of these electrodes by the jet from the ionization probe. Therefore, it is necessary to remove and clean them at an appropriate time point. Further, since these electrodes form an electric field that induces ions toward the ion intake port in the ionization chamber, high accuracy is required for a mutual positional relationship in order to obtain a high ion intake efficiency. Therefore, a technique for easily attaching and detaching the electrodes with high position reproducibility is required.

Here, the push electrode and the convergence electrode in the atmospheric pressure ion source of the mass spectrometer have been described as specific examples, but the same technique as described above is required in various situations where movement of ions is controlled using two electrodes.

A problem to be solved by the present invention is to provide a technique in which two electrodes can be easily attached and detached with high position reproducibility.

The present invention made to solve the above problems provides an ion analyzer configured to control movement of ions flowing out from an ion outflow port, the ion analyzer including:

a base member fixed to the ion outflow port and having a cylindrical concave part;

a first conductive member having conductivity and being a cylindrical member accommodated in the concave part, one end of the first conductive member being exposed and a first ion flow controller configured to control movement of the ions being fixed to the one end of the first conductive member;

an insulating member being a cylindrical member inserted into the first conductive member;

a second conductive member having conductivity and being a rod-shaped member inserted into the insulating member, one end of the second conductive member being exposed and a second ion flow controller configured to control movement of the ions being fixed to the one end of the second conductive member;

a first power feeding unit provided on the base member and to which a first predetermined voltage is applied, the first power feeding unit being provided at a position where the first conductive member comes into contact with the first power feeding unit in a state of being accommodated in the concave part; and a second power feeding unit provided on the base member and to which a second predetermined voltage is applied, the second power feeding unit being provided at a position where the second conductive member comes into contact with the second power feeding unit in a state where the first conductive member accommodating the second conductive member and the insulating member is accommodated in the concave part.

Advantageous Effects of Invention

An ion analyzer according to the present invention controls the movement of the ions flowing out from the ion outflow port using the first ion flow controller and the second ion flow controller. Both the first ion flow controller and the second ion flow controller are typically electrodes. An example of the electrodes is a push electrode and a convergence electrode disposed in an ionization chamber.

In this ion analyzer, the second conductive member and the insulating member are inserted into the first conductive member, and the first conductive member is accommodated in the concave part of the base member. The first predetermined voltage applied to the first power feeding unit is supplied to the first ion flow controller fixed to the first conductive member, and the second predetermined voltage applied to the second power feeding unit is supplied to the second ion flow controller fixed to the second conductive member. Since the insulating member is interposed between the first conductive member and the second conductive member, the first conductive member and the second conductive member are insulated from each other.

In the ion analyzer according to the present invention, the first ion flow controller and the second ion flow controller can be easily attached simply by being accommodated in the concave part of the base member, and the first ion flow controller and second ion flow controller can be easily removed simply by pulling them out of the concave part. Further, since the first conductive member to which the first ion flow controller is fixed and the second conductive member to which the second ion flow controller is fixed are attached to the base member, the reproducibility of the relative position of the first ion flow controller and the second ion flow controller can be improved as compared with a case where the first ion flow controller and the second ion flow controller are individually fixed to the base member. Note, the phrase "the base member fixed to the ion outflow port" is that the base member is fixed at a predetermined position with respect to the ion outflow port when the sample is analyzed, and is not that a position of the base member with respect to the ion outflow port is unchanged. That is, it includes one in which a positional relationship between the base member and the ion outflow port can be adjusted.

DESCRIPTION OF EMBODIMENTS

A mass spectrometer 1 which is an embodiment of an ion analyzer according to the present invention will be described below with reference to the drawings.

Figure 1:
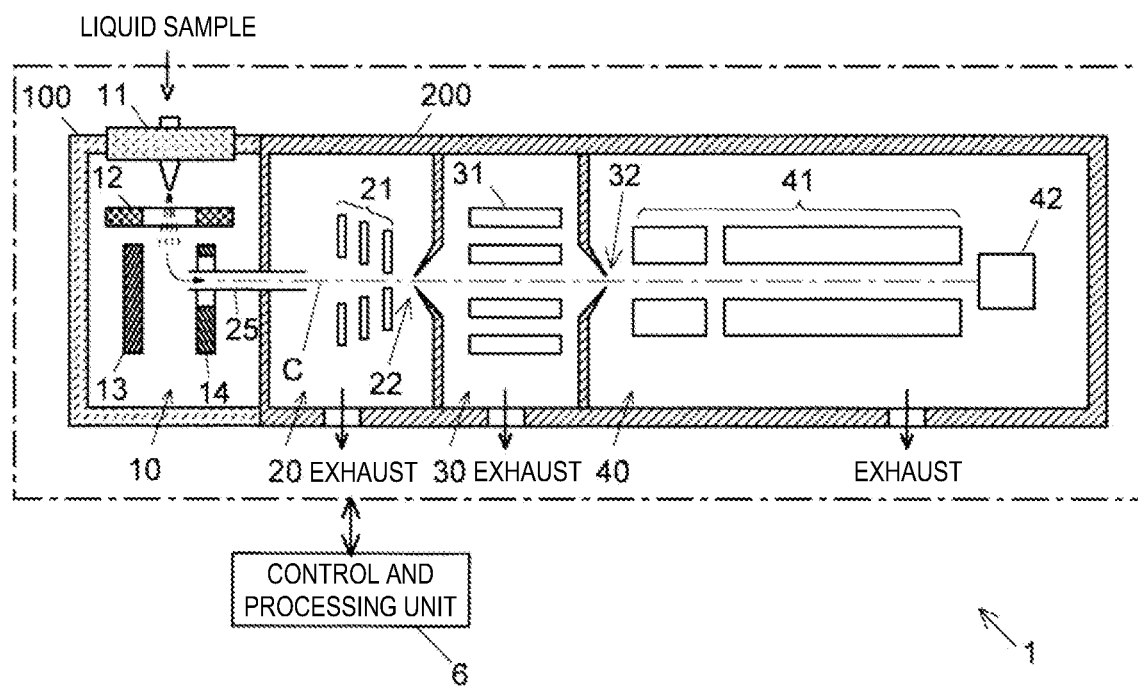
FIG. 1 is a configuration diagram of a main part of a mass spectrometer which is an embodiment of an ion analyzer according to the present invention.

FIG. 1 is a configuration diagram of a main part of the mass spectrometer 1 of the present embodiment. The mass spectrometer 1 of the present embodiment roughly includes an ionization unit 100 and a mass spectrometry chamber 200. The ionization unit 100 is detachably attached to the mass spectrometry chamber 200. An ionization chamber 10 having a substantially atmospheric pressure atmosphere is formed inside the ionization unit 100. In the mass spectrometry chamber 200, a first intermediate vacuum chamber 20, a second intermediate vacuum chamber 30, and an analysis chamber 40 are provided. The inside of the analysis chamber 40 is evacuated to a high vacuum state of, for example, about $10^{-3}$ to $10^{-4}$ Pa by a vacuum pump (not illustrated). The first intermediate vacuum chamber 20 and the second intermediate vacuum chamber 30 sandwiched between the ionization chamber 10 and the analysis chamber 40 are also evacuated by a vacuum pump (not illustrated), and have a configuration of a multi-stage differential exhaust system in which a degree of vacuum is increased stepwise from the ionization chamber 10 toward the analysis chamber 40.

Figure 2:
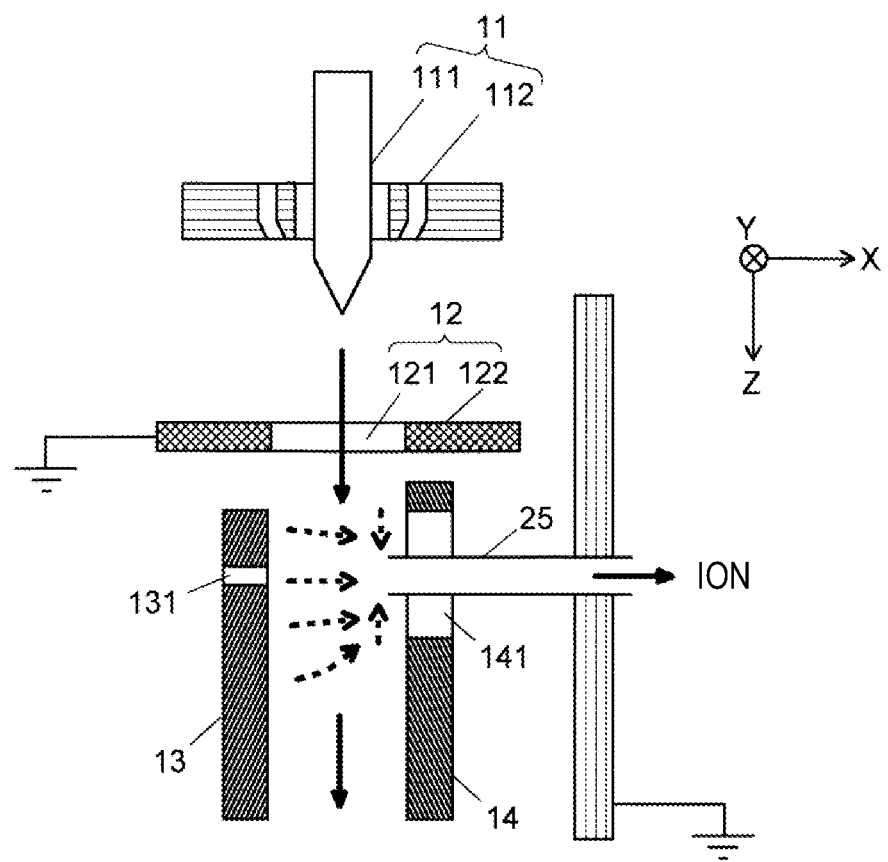
FIG. 2 is a diagram for explaining a configuration of an ionization chamber of the mass spectrometer of the present embodiment.

The ionization unit 100 is detachably attached to the ionization chamber 10. The ionization unit 100 of the present embodiment includes an ESI ionization probe 11. Further, the ionization unit 100 of the present embodiment is provided with an electrode unit attachment part 160 to be described later. As schematically illustrated in FIG. 2, the ESI ionization probe 11 includes an ESI nozzle 111 and an assist gas nozzle 112. The ESI nozzle 111 applies a predetermined high voltage (ESI voltage) to a liquid sample and sprays a nebulizer gas to the liquid sample to nebulize the liquid sample in the ionization chamber 10 as charged droplets.

A heating gas is supplied to the assist gas nozzle 112, and vaporization (desolvation) of the mobile phase contained in the liquid sample sprayed from the ESI nozzle 111 is promoted. The charged droplet sprayed from the ESI ionization probe 11 comes into contact with the surrounding atmosphere to be refined, and a sample component protrudes with a charge to become an ion in a process in which a solvent such as a mobile phase evaporates from the droplet. A ground electrode 12, a push electrode 13, and a convergence electrode 14 are disposed in front of a nebulization flow from the ESI ionization probe 11. The ground electrode 12 is grounded, and a predetermined DC voltage is applied from a power supply (not illustrated) to the push electrode 13 and the convergence electrode 14.

In the present embodiment, the ESI ionization probe 11 and the ground electrode 12 are integrally formed. Further, with the ionization unit 100 attached to the mass spectrometry chamber 200, positions of the ESI ionization probe 11 and the ground electrode 12 can be moved in an X-axis direction. Therefore, in the ionization unit 100 of the present embodiment, before the sample analysis is performed, the position of the ESI ionization probe 11 with respect to a heated capillary 25 is adjusted, and the ESI ionization probe 11 can be disposed at a position where the ion intake efficiency is maximized.

Although the present embodiment is an ESI source, the configuration of the present embodiment described below can also be applied to an atmospheric pressure chemical ionization (APCI) source and an atmospheric pressure photo ionization (APPI) source which are examples of an atmospheric pressure ion source other than the ESI source. In the APCI source or the APPI source, an APCI nozzle or an APPI nozzle is used instead of the ESI nozzle 111.

The ionization chamber 10 and the first intermediate vacuum chamber 20 communicate with each other by the heated capillary 25 having a small diameter. The heated capillary 25 is provided on a side of the mass spectrometry chamber 200 and is heated by a heating mechanism (not illustrated). Since there is a pressure difference between both opening ends of the heated capillary 25, a gas flow flowing from the ionization chamber 10 to the first intermediate vacuum chamber 20 is formed by the pressure difference. Ions generated in the ionization chamber 10 are sucked into the heated capillary 25 along with the flow of the gas flow, and are introduced into the first intermediate vacuum chamber 20 together with the gas flow from an outlet end thereof.

A partition wall separating the first intermediate vacuum chamber 20 and the second intermediate vacuum chamber 30 is provided with a skimmer 22 having a small-diameter opening at a top of the partition wall. In the first intermediate vacuum chamber 20, an ion guide 21 including a plurality of ring-shaped electrodes arranged to surround an ion optical axis C (a central axis of an ion flight path) is disposed. The ions introduced into the first intermediate vacuum chamber 20 are converged in the vicinity of an opening of the skimmer 22 by the action of an electric field formed by the ion guide 21, and are sent into the second intermediate vacuum chamber 30 through the opening.

In the second intermediate vacuum chamber 30, a multipole (for example, an octupole) type ion guide 31 including a plurality of rod electrodes is disposed. The ions are converged by the action of a radio-frequency electric field formed by the ion guide 31, and are sent into the analysis chamber 40 through an opening of a skimmer 32 provided in a partition wall separating the second intermediate vacuum chamber 30 and the analysis chamber 40.

In the analysis chamber 40, a quadrupole mass filter 41 and an ion detector 42 are disposed. The ions introduced into the analysis chamber 40 are introduced into the quadrupole mass filter 41, and only ions having a specific mass-to-charge ratio pass through the quadrupole mass filter 41 and reach the ion detector 42 by the action of an electric field formed by a radio-frequency voltage and a direct-current voltage applied to the quadrupole mass filter 41. The ion detector 42 generates a detection signal corresponding to an amount of reached ions, and outputs the detection signal to a control and processing unit 6.

The control and processing unit 6 controls a measurement operation of each unit described above, and performs processing such as creating mass spectrum data on the basis of the detection signal output from the ion detector 42.

A configuration of the ionization chamber 10 will be described in more detail with reference to FIG. 2. In the following description, for convenience, a blowing direction along a central axis of the nebulization flow from the ESI ionization probe 11 is defined as a Z-axis direction, an ion intake direction along a central axis of the heated capillary 25 orthogonal to the Z-axis direction is defined as an X-axis direction, and a direction orthogonal to the X-axis direction and the Z-axis direction is defined as a Y-axis direction.

In the ionization chamber 10, the ground electrode 12 is disposed at a position closest to the ESI ionization probe 11. The ground electrode 12 is an electrode having a plate-shaped main body part 122 parallel to an X-Y plane, and has an opening 121 centered on the central axis of the nebulization flow from the ESI ionization probe 11.

The convergence electrode 14 is disposed at an end part of the heated capillary 25 on an inlet side. The convergence electrode 14 is a flat plate-shaped electrode parallel to a Y-Z plane, and has an opening 141 formed to surround the end part on the inlet side of the heated capillary 25.

The flat plate-shaped push electrode 13 parallel to the Y-Z plane is disposed to face an inlet end of the heated capillary 25 and the convergence electrode 14 with the nebulization flow interposed between the flat plate-shaped push electrode 13 and the inlet end of the heated capillary 25 and the convergence electrode 14. That is, the nebulization flow from the ESI ionization probe 11 passes through the opening 121 of the ground electrode 12, and then enters a space between the push electrode 13 and the convergence electrode 14. Although the opening 131 is also formed in the push electrode 13 in FIG. 2, this is for use in a dual ion source (DUIS) to be described later, and when only ionization by the ESI method is performed, the push electrode 13 without the opening 131 may be used.

A first predetermined voltage is applied to the convergence electrode 14 from a power supply (not illustrated). Further, a second predetermined voltage having the same polarity as that of the ion to be analyzed is also applied to the push electrode 13 from a power supply (not illustrated). Both the first predetermined voltage and the second predetermined voltage are voltages having the same polarity as the ion to be measured, and the second predetermined voltage is higher than the first predetermined voltage. The ground electrode 12 and the heated capillary 25 are grounded.

The ions that have entered the space between the push electrode 13 and the convergence electrode 14 are pushed out from the push electrode 13 toward the convergence electrode 14 by an electric field formed by a potential difference between the first voltage and the second voltage. Further, in the vicinity of the convergence electrode 14, ions are converged toward the inlet end of the heated capillary 25 and introduced into the heated capillary 25.

The mass spectrometer 1 of the present embodiment is characterized in the configuration by which the push electrode 13 and the convergence electrode 14 are attached and detached. In the present embodiment, the push electrode 13 and the convergence electrode 14 are configured as one electrode unit, and the electrode unit attachment part 160 provided in the ionization unit 100 accommodates the one electrode unit to attach the push electrode 13 and the convergence electrode 14. This attaching and detaching mechanism will be described with reference to FIGS. 3 to 9.

Figure 3:
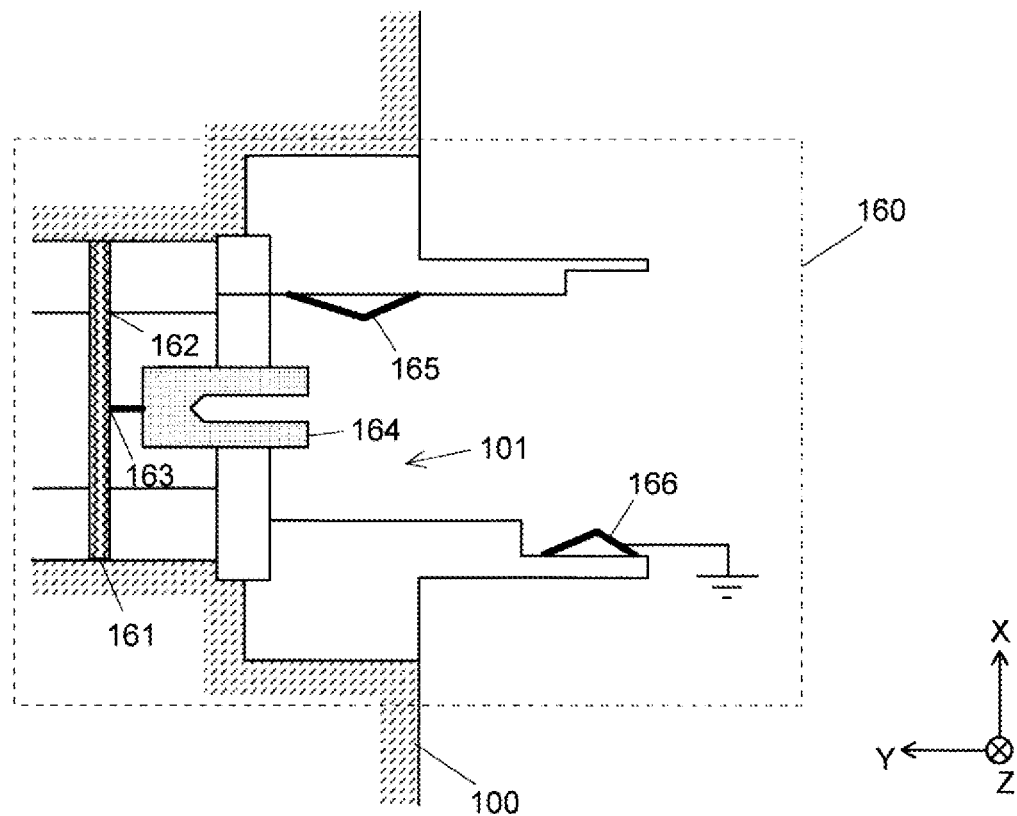
FIG. 3 is an X-Y cross-sectional view for explaining a configuration of an electrode unit attachment part in the present embodiment.

FIG. 3 is an X-Y cross-sectional view illustrating a schematic configuration of the electrode unit attachment part 160. The electrode unit attachment part 160 is provided in a cylindrical concave part 101 formed on one end surface of the ionization unit 100. The ionization unit 100 is a unit constituting the ionization chamber 10 including the ESI ionization probe 11 and the like, and is detachably attached to the mass spectrometry chamber 200 provided with the first intermediate vacuum chamber 20 and the like. That is, the ionization unit 100 corresponds to a base member in the present invention, and has a cylindrical concave part fixed to the ESI ionization probe 11 that is an ion outflow port. Further, the convergence electrode 14 and the push electrode 13 correspond to a first ion flow controller and a second ion flow controller, respectively, in the present invention.

The electrode unit attachment part 160 includes a power feeding board 161 on which a power feeding circuit is formed. The power feeding circuit is provided with a first power feeding unit 162 to which a first predetermined voltage is applied from a power supply (not illustrated) and which supplies the voltage to the convergence electrode 14, and a second power feeding unit 163 to which a second voltage is applied from a power supply (not illustrated) and which supplies the voltage to the push electrode 13. The first power feeding unit 162 is connected to a first leaf spring 165 attached to an inner surface of the concave part 101. The second power feeding unit 163 is connected to a plug accommodating part 164. Further, a second leaf spring 166 is attached to an inner surface of the concave part 101 opposite to a side to which the first leaf spring 165 is attached. The second leaf spring 166 is grounded.

Figure 4:
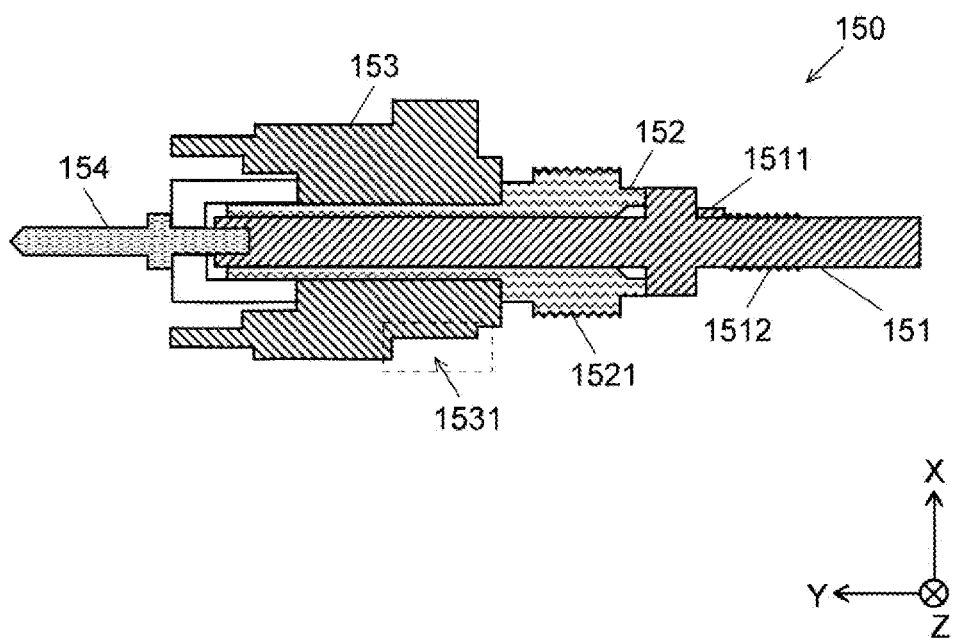
FIG. 4 is an X-Y cross-sectional view for explaining a configuration of an electrode unit main body in the present embodiment.

FIG. 4 is an X-Y cross-sectional view illustrating a configuration of a main body part of the electrode unit 150. The main body part of the electrode unit 150 includes a push electrode fixation member 151, a cylindrical insulating member 152 attached to an outer periphery of the push electrode fixation member 151, and a cylindrical convergence electrode fixation member 153 attached to an outer periphery of the insulating member 152. The push electrode fixation member 151 and the convergence electrode fixation member 153 are both made of a conductive material (for example, stainless steel). A cut part 1531 cut flat is formed on a part of an outer periphery of the convergence electrode fixation member 153. The cut part 1531 is formed so as not to bring the convergence electrode fixation member 153 into contact with the second leaf spring 166.

Another convergence electrode fixation member 153 in which the cut part 1531 is not formed and which can be replaced with a convergence electrode fixation member 253 is also prepared. The convergence electrode fixation member 253 will be described later. The convergence electrode fixation member 153, the insulating member 152, and the push electrode fixation member 151 correspond to a first conductive member, an insulating member, and a second conductive member in the present invention, respectively.

The push electrode fixation member 151, the insulating member 152, and the convergence electrode fixation member 153 are long in this order, and in a state where they are integrally formed, a part of the insulating member 152 is exposed from the convergence electrode fixation member 153, and a part of the push electrode fixation member 151 is exposed from the insulating member 152. A screw groove 1521 is formed in a part of the insulating member 152 in a circumferential direction. A convex part for positioning when the convergence electrode 14 is attached is formed on an end surface (surface on a side to which the convergence electrode 14 is attached) of the convergence electrode fixation member 153. However, this convex part is not illustrated in FIG. 4 because it is located on a back side of the paper surface. On a side surface of the push electrode fixation member 151, a convex part 1511 for positioning when the push electrode 13 is attached is formed, and the screw groove 1512 is formed on a tip side of the push electrode fixation member. Further, a banana plug 154 is attached to a base end part (an end part on a side attached to the electrode unit attachment part 160) of the push electrode fixation member 151.

Figure 5:
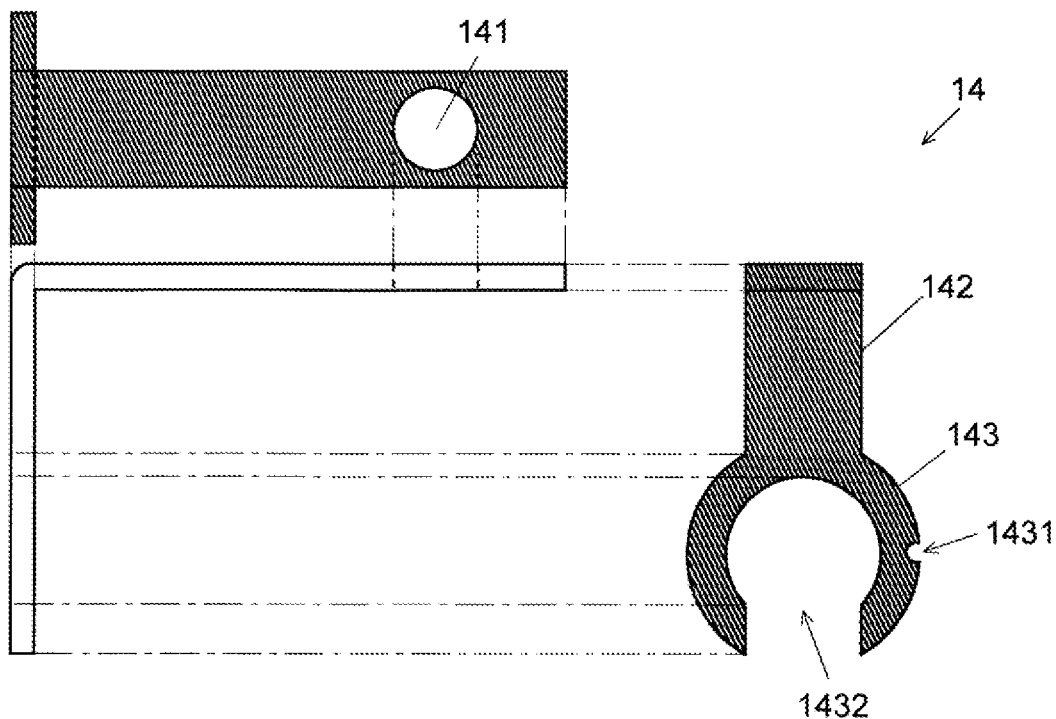
FIG. 5 is a diagram for explaining a configuration of a convergence electrode in the present embodiment.

FIG. 5 illustrates a configuration of the convergence electrode 14. The convergence electrode 14 is an L-shaped plate-like member as illustrated in a lower left of FIG. 5. As illustrated in an upper part of FIG. 5, the opening 141 is formed at a tip part of a flat plate-shaped part (corresponding to a second flat plate-shaped part of the convergence electrode in the present invention) on a long side of the L shape. Further, as illustrated in a lower right part of FIG. 5, a flat plate-shaped part (corresponding to a first flat plate-shaped part of the convergence electrode in the present invention) on a short side of the L shape includes a flat plate part 142 and a ring part 143. A notch 1431 for positioning (corresponding to a positioning concave part in the present invention) is provided on an outer periphery of the ring part 143. Further, a ring part opening 1432 is provided in a part of a ring of the ring part 143.

Figure 6:
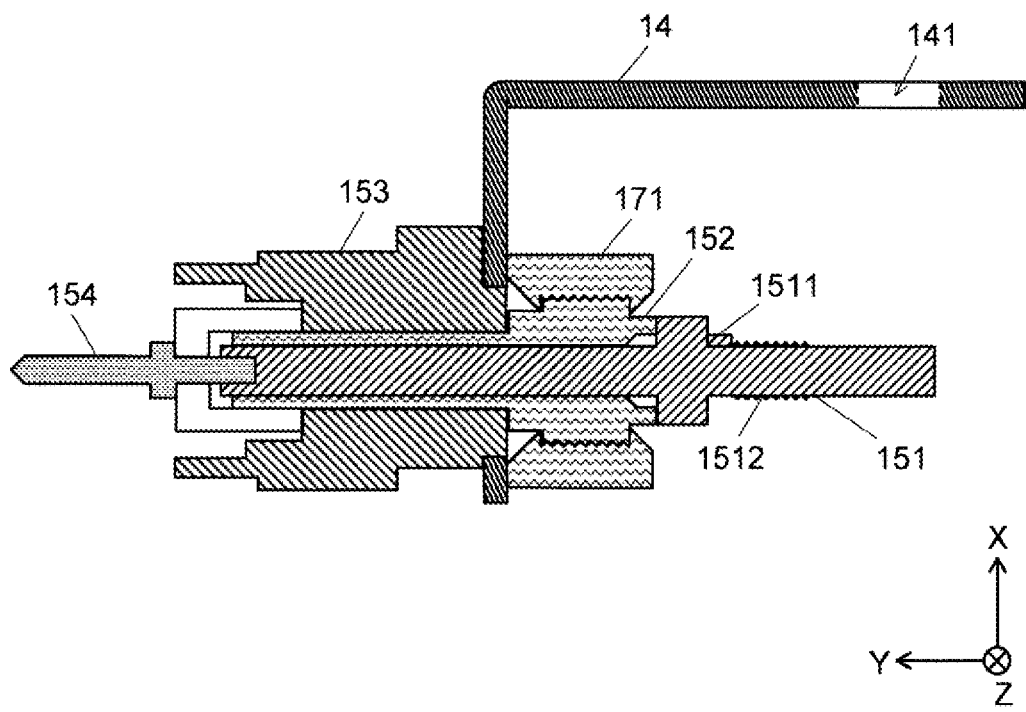
FIG. 6 is an X-Y side view in a state where the convergence electrode is attached in the present embodiment.

FIG. 6 is an X-Y cross-sectional view illustrating a state where the convergence electrode 14 is attached and fixed to the main body part of the electrode unit 150. The convergence electrode 14 is attached by inserting the ring part opening 1432 of the ring part 143 into an end surface of the convergence electrode fixation member 153. Further, when the convergence electrode 14 is attached, the notch 1431 is positioned in a circumferential direction by being inserted into a convex part (corresponding to a positioning convex part in the present invention) formed on the end surface of the convergence electrode fixation member 153. Further, the convergence electrode 14 is fixed by attaching a nut member 171 having an insulating property to the screw groove 1521 formed on the outer periphery of the insulating member 152. As the nut member 171, for example, a knurled nut made of PEEK resin can be used.

Figure 7:
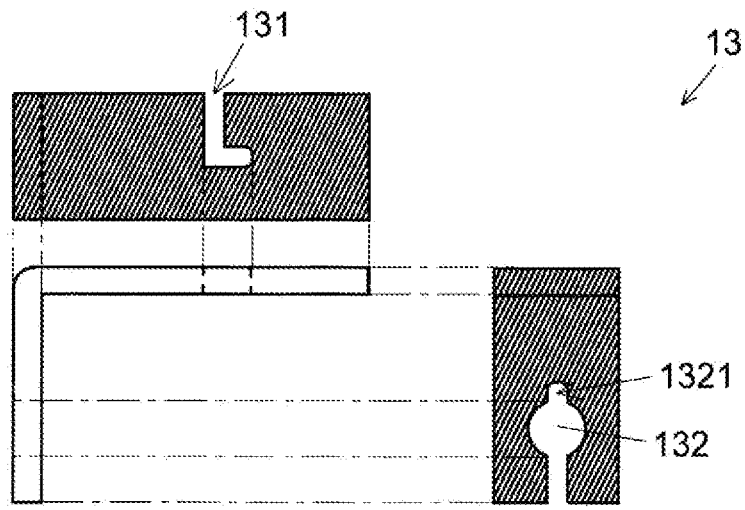
FIG. 7 is a diagram for explaining a configuration of a push electrode in the present embodiment.

FIG. 7 illustrates a configuration of the push electrode 13. The push electrode 13 is also an L-shaped plate-like member as illustrated in a lower left of FIG. 7. As illustrated in an upper part of FIG. 7, an L-shaped opening 131 is formed in a flat plate part (corresponding to a second flat plate-shaped part of the push electrode in the present invention) on a long side of the L shape. Further, as illustrated in a lower right of FIG. 7, an opening 132 having a shape in which a straight line and a circle are combined is formed at a tip part of a flat plate-shaped part (corresponding to a first flat plate-shaped part of the push electrode in the present invention) on a short side of the L shape, and a U-shaped notch 1321 (corresponding to a positioning concave part in the present invention) is formed at a concave parted position of the opening.

Figure 8:
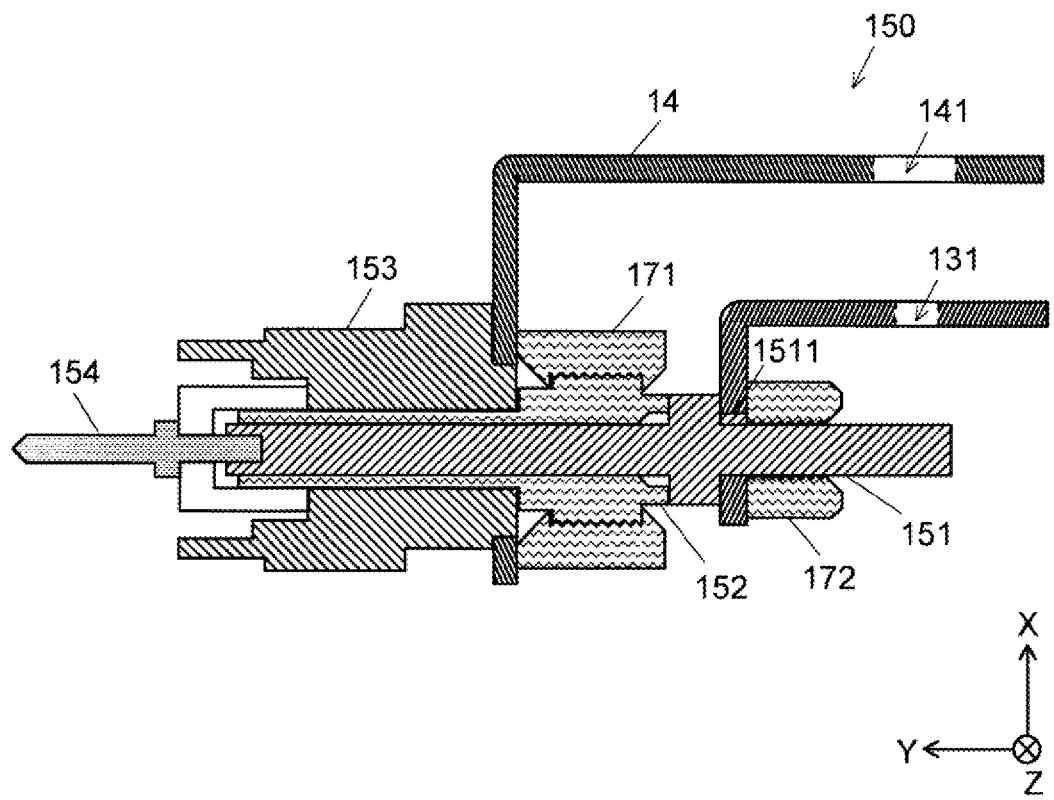
FIG. 8 is an X-Y cross-sectional view in a state where the push electrode is attached in the present embodiment.

FIG. 8 is an X-Y sectional view illustrating a state where the push electrode 13 is further attached and fixed in the state described with reference to FIG. 6. The push electrode 13 is attached by inserting the push electrode fixation member 151 into the opening 132 from a distal end side. The push electrode 13 is positioned in the circumferential direction of the push electrode fixation member 151 by aligning the U-shaped notch 1321 located at the back of the opening 132 with the convex part 1511 (corresponding to a positioning convex part in the present invention) of the push electrode fixation member 151. Further, the push electrode 13 is fixed by attaching the nut member 172 to the screw groove 1512 formed on the outer periphery of the push electrode fixation member 151.

As the nut member 172, it is preferable to use a member having an insulating property. One example is a knurled nut made of PEEK resin. If the nut member 172 is made of metal or the like having conductivity, the nut member 172 has the same potential as the push electrode 13. At this time, if the nut member 172 and the ground electrode 12 are close to each other, an undesired discharge may occur between them. Further, the nut member 172 may also have a high temperature (for example, about 100° C.) due to heat from the heated capillary 25, and when the nut member 172 and the push electrode fixation member 151 made of the same kind of metal or the like are continuously used at a high temperature, there is a possibility that both are burned. In the present embodiment, by using the nut member 172 having insulating properties, it is possible to prevent occurrence of discharge between the nut member and the ground electrode 12 and occurrence of seizure between the nut member and the push electrode fixation member 151. However, whether or not such discharge or seizure occurs depends on a positional relationship with a member such as the ground electrode 12, a material constituting the push electrode fixation member 151, and the like. The use of the insulating nut member 172 is one of the preferred embodiments and is not an essential requirement.

Figure 9:
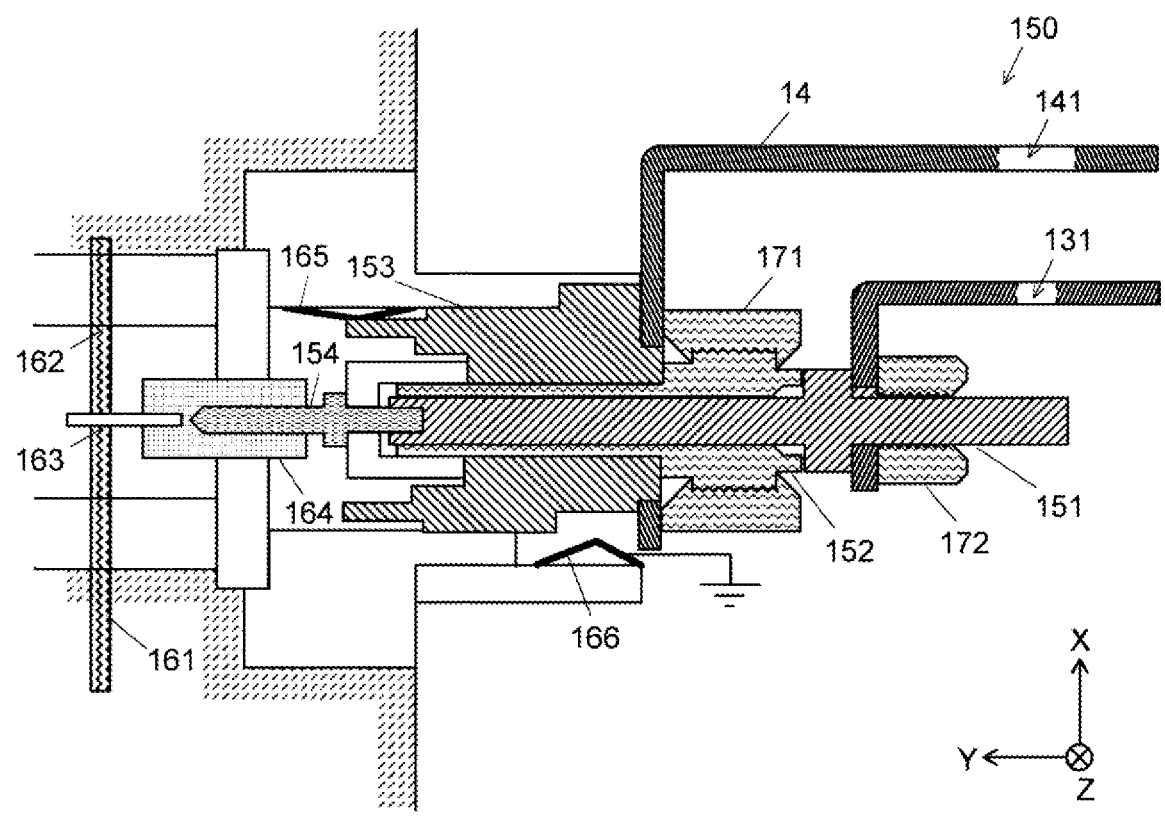
FIG. 9 is an X-Y cross-sectional view in a state where an electrode unit is attached to the electrode unit attachment part in the present embodiment.

FIG. 9 is a diagram illustrating a state where the electrode unit 150 described with reference to FIG. 8 is installed in the electrode unit attachment part 160. In FIG. 9, the ESI ionization probe 11 is located on the front side of the drawing. When a side surface of the convergence electrode fixation member 153 comes into contact with the first leaf spring 165, a first predetermined voltage is applied to the convergence electrode 14 via the convergence electrode fixation member 153. Further, when the banana plug 154 of the electrode unit 150 is inserted into the plug accommodating part 164, a second predetermined voltage is applied to the push electrode 13 through the push electrode fixation member 151. Both the first predetermined voltage and the second predetermined voltage are voltages having the same polarity as the ions to be measured, and the second predetermined voltage is higher than the first predetermined voltage. For example, at the time of measuring positive ions, a voltage of +4 kV is applied to the push electrode 13, and a voltage of +2 kV is applied to the convergence electrode 14.

In the present embodiment, the push electrode 13 and the convergence electrode 14 are configured as the electrode unit 150, and both the push electrode 13 and the convergence electrode 14 can be easily attached by one touch only by attaching the electrode unit 150 to the electrode unit attachment part 160. Further, since the push electrode 13 and the convergence electrode 14 are fixed to the electrode unit 150, they are positioned with high accuracy. Furthermore, the push electrode 13 and the convergence electrode 14 can be easily removed at a time only by removing the electrode unit 150.

In the present embodiment, only by attaching the electrode unit 150 to the electrode unit attachment part 160, a predetermined voltage can be applied to the push electrode 13 via the banana plug 154 and the push electrode fixation member 151, and a predetermined voltage can be applied to the convergence electrode 14 via the convergence electrode fixation member 153. Therefore, power can be easily supplied to these electrodes without separately providing a complicated power feeding path.

In the present embodiment, both the push electrode 13 and the convergence electrode 14 are members having an L-shaped cross section, and the short sides of the electrodes are fixed. As a result, a position of the main body part of the electrode unit 150 is shifted from the traveling direction of the charged droplets sprayed from the ESI ionization probe 11. As a result, the possibility that the charged droplets are directly sprayed to the electrode unit 150 and the charged droplets adhere between the push electrode 13 and the convergence electrode 14 is suppressed, and occurrence of undesired energization between both electrodes is prevented. Further, it is also possible to prevent the inside of the ionization chamber 10 from being contaminated due to attachment of the charged droplets, and increase in background or decrease in sensitivity at the time of measurement. Furthermore, the insulating nut member 171 covering the entire circumferential direction is disposed in a part of the electrode unit 150 located between the push electrode 13 and the convergence electrode 14. A side of the push electrode 13 of an inner surface screw part of the insulating nut member 171 is largely chamfered. This chamfered part is a recessed part when viewed from the ESI ionization probe 11. Therefore, even if the charged droplets sprayed from the ESI ionization probe 11 adhere between both electrodes (an outer surface of the nut member 171), the charged droplets hardly adhere to the chamfered part of the nut member 171, and energization does not occur between the push electrode 13 and the convergence electrode 14.

In the present embodiment, the electrode unit attachment part 160 is configured as a part of the ionization unit 100. Although it is also possible to form the electrode unit attachment part on the partition wall of the ionization chamber 10 and the first intermediate vacuum chamber 20, some mass spectrometers have a configuration in which the partition wall is heated by a temperature control block, and the heated capillary 25 is heated by the heat to promote desolvation. This temperature control block is heated to, for example, about 500° C. In the mass spectrometer having such a configuration, when the electrode unit 150 is attached to the partition wall, heat from the temperature control block is transferred to the electrode unit 150, and each member constituting the electrode unit 150 expands, and there is a possibility that a shift occurs in the position and direction of the push electrode 13 and the convergence electrode 14. Further, there is a possibility that the volume resistivity of the insulating member changes and the potential difference between the push electrode 13 and the convergence electrode 14 changes. Then, an electric field formed between both electrodes is disturbed, and an amount of ions introduced into the heated capillary 25 decreases. On the other hand, in the present embodiment, since the electrode unit 150 is attached to the ionization unit 100, there is no concern that the electrode unit 150 is heated and the above-described problem occurs.

Next, a DUIS electrode unit 250 configured using the convergence electrode fixation member 253 will be described. The DUIS electrode unit 250 is used as an APCI source by APCI ionization or a dual ion source (DUIS) that generates ions from charged droplets by simultaneously performing ESI ionization and APCI ionization. Components common to those of the electrode unit 150 in the above embodiment are denoted by the same reference signs, and the description thereof is appropriately omitted.

Figure 10:
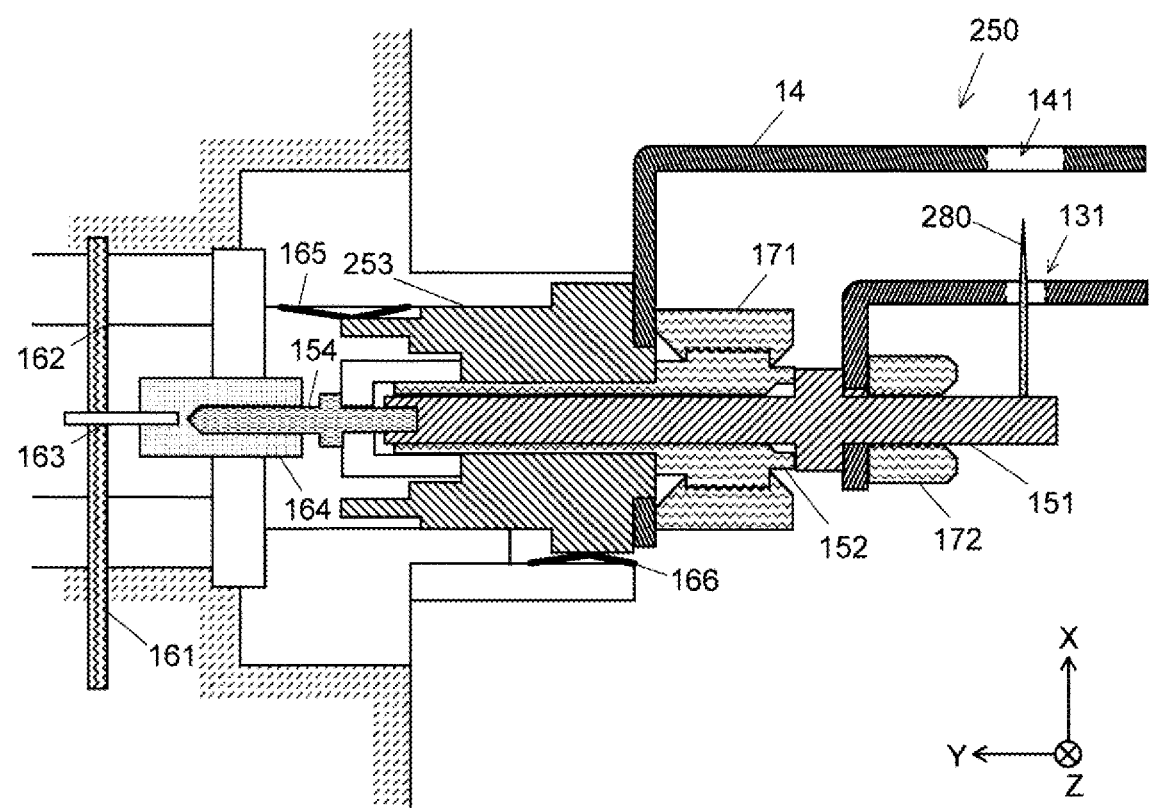
FIG. 10 is an X-Y cross-sectional view in a state where the electrode unit using a DUIS electrode unit is attached to the electrode unit attachment part in the mass spectrometer of the present embodiment.
Figure 11:
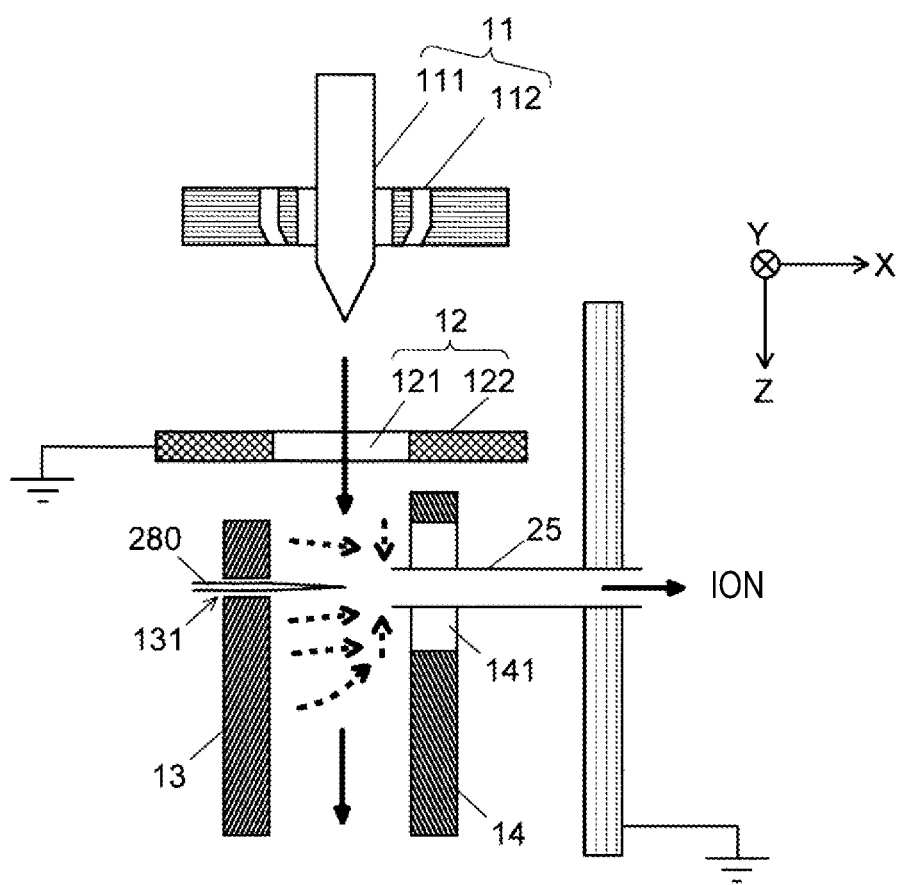
FIG. 11 is a diagram for explaining a configuration of the ionization chamber in a case where the DUIS electrode unit is used in the mass spectrometer of the present embodiment.

FIG. 10 is an X-Y cross-sectional view in a state where the convergence electrode fixation member 153 in FIG. 9 is changed to the convergence electrode fixation member 253, and a corona needle 280 is attached to a distal end part of the push electrode fixation member 151, so that the electrode unit 150 is changed to the DUIS electrode unit 250. Further, FIG. 11 illustrates a configuration of the ionization chamber 10 when the DUIS electrode unit 250 is used. As illustrated in FIG. 10, in this configuration, a side surface of the convergence electrode fixation member 253 comes into contact with the second leaf spring 166, whereby the convergence electrode fixation member 253 and the convergence electrode 14 are grounded. Further, the same voltage as that of the push electrode 13 is applied to the corona needle 280 via the banana plug 154 and the push electrode fixation member 151. Therefore, the APCI ionization can be performed at low cost without separately providing an additional power supply or a complicated power feeding path. As illustrated in FIG. 11, the ESI method and the APCI method can be performed simultaneously by using the DUIS electrode unit 250.

In the DUIS, it is possible to simultaneously ionize a compound suitable for ESI (mainly a highly polar compound) and a compound suitable for APCI (mainly a low or medium polar compound), and it is possible to analyze a wide range of compounds from a low polarity compound to a high polarity compound at a time. The ESI ionization and the DUIS ionization can be easily switched only by replacing the electrode unit 150 and the DUIS electrode unit 250. By the potential gradient from the push electrode 13 toward the convergence electrode 14, it is possible to enhance the intake efficiency of ions derived from the target substance while suppressing contamination of the mass spectrometry section or deterioration of the accuracy of analysis of the target substance due to entrance of neutral molecules derived from the mobile phase or the like into the mass spectrometry section.

In the configuration illustrated in FIG. 9, the corona needle 280 can be attached to the distal end of the push electrode fixation member 151, but in this case, a voltage is applied to the convergence electrode 14, and an electric field is formed between the convergence electrode and the heated capillary 25 which is grounded. In the DUIS, it is necessary to generate stable corona discharge by forming a strong electric field only at a tip part of the corona needle 280, but when a high voltage is applied to the corona needle 280 in a state where a voltage is applied to the convergence electrode 14, arc discharge occurs between the corona needle 280 and the heated capillary 25 due to an electric field at a tip of the heated capillary 25, and stable corona discharge does not occur. On the other hand, in the modification example illustrated in FIG. 10, since the convergence electrode 14 is grounded and no electric field is formed between the convergence electrode and the heated capillary 25, stable corona discharge can be generated at the tip of the corona needle 280, and APCI ionization efficiency can be improved.

When the ESI ionization and the DUIS ionization are performed, a predetermined ESI voltage is applied to the ESI nozzle 111, and the liquid sample is charged and nebulized. However, when only the APCI ionization is performed, no voltage is applied to the ionization probe 11. In the APCI, the liquid sample and the solvent are vaporized without being charged, and ions generated from the solvent by corona discharge at the tip of the corona needle 280 and sample molecules are reacted to ionize the sample molecules.

The embodiment and the modification example described above are all examples, and can suitably be altered according to the spirit of the present invention. The specific shape of each member described in the above embodiment and modification example can be changed as appropriate. Further, in each of the above embodiment and modification example, the mass spectrometer is used, but the same configuration as in the above embodiment and modification example can be used for other ion analyzers such as an ion mobility analyzer.

In the above embodiment, the convergence electrode 14 is positioned by inserting the notch 1431 of the convergence electrode 14 into the convex part provided on the end surface of the convergence electrode fixation member 153, but the convergence electrode 14 can also be fixed by forming a convex part on the flat plate part 142 or the ring part 143 of the convergence electrode 14 and inserting the convex part into the concave part formed on the end surface of the convergence electrode fixation member 153. Alternatively, the convergence electrode 14 can be positioned by forming a notch (or a convex part) on a proximal end side (on a side of the flat plate part 142) of the ring part 143 and forming a convex part (or a concave part) on a side surface of the insulating member 152.

In the above embodiment, the push electrode 13 is positioned by inserting the notch 1321 of the push electrode 13 into the convex part 1511 provided on a side surface of the push electrode fixation member 151, but the push electrode 13 may be positioned by forming a concave part instead of the convex part 1511 and a convex part instead of the notch 1321. Alternatively, the push electrode 13 can be fixed by forming a convex part and inserting the convex part into a concave part formed on an end surface of the insulating member 152.

[Modes]

It is understood by those skilled in the art that the plurality of exemplary embodiments described above are specific examples of the following modes.

(Clause 1)

A mode provides an ion analyzer configured to control movement of ions flowing out from an ion outflow port, the ion analyzer including:

a base member fixed to the ion outflow port and having a cylindrical concave part;

a first conductive member having conductivity and being a cylindrical member accommodated in the concave part, one end of the first conductive member being exposed and a first ion flow controller configured to control movement of the ions being fixed to the one end of the first conductive member;

an insulating member being a cylindrical member inserted into the first conductive member;

a second conductive member having conductivity and being a rod-shaped member inserted into the insulating member, one end of the second conductive member being exposed and a second ion flow controller configured to control movement of the ions being fixed to the one end of the second conductive member;

a first power feeding unit provided on the base member and to which a first predetermined voltage is applied, the first power feeding unit being provided at a position where the first conductive member comes into contact with the first power feeding unit in a state of being accommodated in the concave part; and a second power feeding unit provided on the base member and to which a second predetermined voltage is applied, the second power feeding unit being provided at a position where the second conductive member comes into contact with the second power feeding unit in a state where the first conductive member accommodating the second conductive member and the insulating member is accommodated in the concave part.

The ion analyzer recited in Clause 1 controls the movement of the ions flowing out from the ion outflow port using the first ion flow controller and the second ion flow controller. Both the first ion flow controller and the second ion flow controller are typically electrodes. An example of the electrodes is a push electrode and a convergence electrode disposed in an ionization chamber.

In this ion analyzer, the second conductive member and the insulating member are inserted into the first conductive member, and the first conductive member is accommodated in the concave part of the base member. The first predetermined voltage is applied from the first power feeding unit to the first ion flow controller fixed to the first conductive member, and the second predetermined voltage is applied from the second power feeding unit to the second ion flow controller fixed to the second conductive member. Since the insulating member is interposed between the first conductive member and the second conductive member, the first conductive member and the second conductive member are insulated from each other.

In the ion analyzer recited in Clause 1, the first ion flow controller and the second ion flow controller can be easily attached simply by being accommodated in the concave part of the base member, and the first ion flow controller and second ion flow controller can be easily removed simply by pulling them out of the concave part. Further, since the first conductive member to which the first ion flow controller is fixed and the second conductive member to which the second ion flow controller is fixed are integrated and attached to the base member, the reproducibility of the relative position of the first ion flow controller and the second ion flow controller can be improved as compared with a case where the first ion flow controller and the second ion flow controller are individually fixed to the base member. In the ion analyzer of Clause 1, "the base member fixed to the ion outflow port" is not only a configuration in which a position of the base member with respect to the ion outflow port is invariable, but also includes a configuration in which a relative positional relationship between the two can be changed.

(Clause 2)

In the ion analyzer recited in Clause 1,
the first ion flow controller has a first flat plate-shaped part in which an opening is formed, and the first ion flow controller is attached by inserting the first conductive member into the opening, and is fixed by pressing the first flat plate-shaped part against the first conductive member with a fixation member having an insulating property from a side opposite to the first conductive member.

In the ion analyzer recited in Clause 2, the first ion flow controller is fixed by inserting the first conductive member into the opening formed in the first flat plate-like part of the first ion flow controller and fixing the first conductive member with the fixation member. Since the fixation member has an insulating property, a possibility that undesired energization occurs between the first ion flow controller and the second ion flow controller is suppressed.

(Clause 3)

In the ion analyzer recited in Clause 2,
a positioning convex part is formed on one of the first flat plate-shaped part of the first ion flow controller and the first conductive member or the insulating member, and a positioning concave part is formed on the other, and the first ion flow controller is positioned by aligning the convex part and the concave part.

In the ion analyzer recited in Clause 3, the positioning concave part (or convex part) formed on the first flat plate-shaped part of the first ion flow controller and the positioning convex part (or concave part) provided in the first conductive member or the insulating member are aligned, so that the first ion flow controller can be easily positioned with high accuracy.

(Clause 4)

In the ion analyzer recited in any one of Clause 1 to Clause 3,
the second ion flow controller has a first flat plate-shaped part in which an opening is formed, and the second ion flow controller is attached by inserting the second conductive member into the opening, and is fixed by pressing the first flat plate-shaped part against the second conductive member with a fixation member from a side opposite to the insulating member.

In the ion analyzer recited in Clause 4, the second ion flow controller is fixed by inserting the second conductive member into the opening formed in the first flat plate-shaped part of the second ion flow controller and fixing the second conductive member with the fixation member.

(Clause 5)

In the ion analyzer recited in Clause 4,
a positioning convex part is formed on one of the first flat plate-shaped part of the second ion flow controller and the second conductive member or the insulating member, and a positioning concave part is formed on the other, and the second ion flow controller is positioned by aligning the convex part and the concave part.

In the ion analyzer recited in Clause 5, the second ion flow controller can be easily positioned with high accuracy by aligning the positioning concave part (or convex part) formed in the first flat plate-shaped part of the second ion flow controller and the positioning convex part (or concave part) provided in the second conductive member or the insulating member.

(Clause 6)

The ion analyzer recited in any one of Clause 1 to Clause 5, further includes:
an ionization probe configured to allow the ions to flow out; and
an ion introduction tube configured to introduce the ions from a space from which the ions flow out of the ionization probe into a space in which the ions are analyzed,
in which the first ion flow controller is a convergence electrode in which an opening surrounding an end part on an inlet side of the ion introduction tube is formed,
the second ion flow controller is a push electrode disposed at a position facing an end part on an inlet side of the ion introduction tube and the convergence electrode with a nebulization flow of sample droplets from the ionization probe interposed between the push electrode and the end part on the inlet side of the ion introduction tube and the convergence electrode, and
the first predetermined voltage and the second predetermined voltage are voltages having the same polarity as polarity of the ions, and an absolute value of the second predetermined voltage is larger than an absolute value of the first predetermined voltage.

The ion analyzer recited in any one of Clause 1 to Clause 5 can be suitably used as the ion analyzer recited in Clause 6, which includes the push electrode and the convergence electrode that guide the ions flowing out from the ionization probe to the ion introduction tube.
(Clause 7)

In the ion analyzer recited in Clause 6,
the base member is an ionization unit including the ionization probe.

When the first conductive member, the insulating member, and the second conductive member are heated and expanded, a distance between the convergence electrode and the push electrode may change, or a volume resistivity of the insulating member may change, resulting in disturbance of an electric field formed between both the electrodes. In the ion analyzer recited in Clause 7, since an electrode unit is attached to the unheated ionization unit, a possibility of occurrence of disturbance in the electric field is suppressed.
(Clause 8)

In the ion analyzer recited in Clause 6 or Clause 7,
the ion introduction tube is disposed so as to be orthogonal or oblique to a traveling direction of ions flowing out from the ionization probe,
the convergence electrode is an L-shaped member including a first flat plate-shaped part and a second flat plate-shaped part extending to the first flat plate-shaped part and formed with an opening surrounding an end part on an inlet side of the ion introduction tube, and
the push electrode is an L-shaped member including a first flat plate-shaped part and a second flat plate-shaped part extending to the first flat plate-shaped part and disposed to face the end part on the inlet side of the ion introduction tube.

In the ion analyzer of Clause 8, both the convergence electrode and the push electrode are L-shaped members obtained by combining the first flat plate-shaped part and the second flat plate-shaped part, and the convergence electrode and the push electrode can be fixed to the first conductive member and the second conductive member by the first flat plate-shaped part at a position away from the second flat plate-shaped part disposed close to the ions flowing out from the ionization probe. Therefore, the first conductive member, the insulating member, and the second conductive member are disposed to be shifted from the traveling direction of the ions, and it is possible to prevent undesired energization from occurring between the push electrode and the convergence electrode due to direct injection of the ions to these members. Further, adhesion of the ions to these members prevents an increase in background and a decrease in sensitivity during measurement.
(Clause 9)

The ion analyzer recited in Clause 8, further includes:
a third conductive member used in such a manner that the third conductive member is capable of being exchanged for the first conductive member;
a grounding part provided at a position where the first conductive member is not in contact with the grounding part and the third conductive member is in contact with the grounding part in a state where the grounding part is accommodated in the concave part; and
a conductive needle attached to the second conductive member and to which the second predetermined voltage is applied,
in which an opening into which the needle is inserted is formed in the first flat plate-shaped part of the push electrode, and a tip of the needle is located between the push electrode and the convergence electrode.

In the ion analyzer of Clause 9, APCI ionization can be performed at low cost without separately providing an additional power supply or a complicated power feeding path by using the third conductive member and the conductive needle in addition to the ionization using the first conductive member. Further, when an ESI ionization probe is used as the ion analyzer of Clause 9, both ESI ionization and APCI ionization can be performed simultaneously. In addition, by a potential gradient from the push electrode toward the convergence electrode, it is possible to enhance the intake efficiency of ions derived from a target substance while suppressing contamination of a mass spectrometry section or degradation of the analysis accuracy of the target substance due to entrance of neutral molecules derived from a mobile phase or the like into the mass spectrometry section. Further, since the convergence electrode is grounded when the APCI ionization or ionization by DUIS is performed, stable corona discharge can be generated at a tip of the corona needle, and an APCI ionization efficiency can be improved. Furthermore, the ESI ionization and DUIS ionization can be easily switched only by replacing the electrode unit 150 and the DUIS electrode unit 250.
(Clause 10)

In the ion analyzer recited in Clause 9,
the first conductive member includes a cut part formed at a position of the third conductive member in contact with the grounding part.

In the ion analyzer of Clause 10, since the structures of the first conductive member and the third conductive member are similar to each other, two types of conductive members can be easily manufactured at low cost.

REFERENCE SIGNS LIST

1 . . . Mass Spectrometer
10 . . . Ionization Chamber
100 . . . Ionization Unit
11 . . . ESI Ionization Probe
111 . . . ESI Nozzle
112 . . . Assist Gas Nozzle
12 . . . Ground Electrode
121 . . . Opening
122 . . . Main Body Part
13 . . . Push Electrode
131 . . . Opening
132 . . . Opening
1321 . . . Notch
14 . . . Convergence Electrode
141 . . . Opening
142 . . . Flat Plate Part
143 . . . Ring Part
1431 . . . Notch
1432 . . . Ring Part Opening
25 . . . Heated Capillary
150 . . . Electrode Unit
151 . . . Push Electrode Fixation Member
1511 . . . Convex Part
1512 . . . Screw Groove
152 . . . Insulating Member
1521 . . . Screw Groove
153 . . . Convergence Electrode Fixation Member
1531 . . . Cut Part
154 . . . Banana Plug
160 . . . Electrode Unit Attachment Part
161 . . . Power Feeding Board 162 . . . First Power Feeding Unit
163 . . . Second Power Feeding Unit
164 . . . Plug Accommodating Part
165 . . . First Leaf Spring
166 . . . Second Leaf Spring
171, 172 . . . Nut Member
250 . . . DUIS Electrode Unit
253 . . . Convergence Electrode Fixation Member
280 . . . Corona Needle
6 . . . Control And Processing Unit
C . . . Ion Optical Axis

The invention claimed is:

1. An ion analyzer configured to control movement of ions flowing out from an ion outflow port, the ion analyzer comprising:
  a base member fixed to the ion outflow port and having a cylindrical concave part;
  a first conductive member having conductivity and being a cylindrical member accommodated in the concave part, one end of the first conductive member being exposed and a first ion flow controller configured to control movement of the ions being fixed to the one end of the first conductive member;
  an insulating member being a cylindrical member inserted into the first conductive member;
  a second conductive member having conductivity and being a rod-shaped member inserted into the insulating member, one end of the second conductive member being exposed and a second ion flow controller configured to control movement of the ions being fixed to the one end of the second conductive member;
  a first power feeding unit provided on the base member and to which a first predetermined voltage is applied, the first power feeding unit being provided at a position where the first conductive member comes into contact with the first power feeding unit in a state of being accommodated in the concave part; and
  a second power feeding unit provided on the base member and to which a second predetermined voltage is applied, the second power feeding unit being provided at a position where the second conductive member comes into contact with the second power feeding unit in a state where the first conductive member accommodating the second conductive member and the insulating member is accommodated in the concave part.

2. The ion analyzer according to claim 1, wherein the first ion flow controller has a first flat plate-shaped part in which an opening is formed, and the first ion flow controller is attached by inserting the first conductive member into the opening, and is fixed by pressing the first flat plate-shaped part against the first conductive member with a fixation member having an insulating property from a side opposite to the first conductive member.

3. The ion analyzer according to claim 2, wherein a positioning convex part is formed on one of the first flat plate-shaped part of the first ion flow controller and the first conductive member or the insulating member, and a positioning concave part is formed on the other, and the first ion flow controller is positioned by aligning the convex part and the concave part.

4. The ion analyzer according to claim 1, wherein the second ion flow controller has a first flat plate-shaped part in which an opening is formed, and the second ion flow controller is attached by inserting the second conductive member into the opening, and is fixed by pressing the first flat plate-shaped part against the second conductive member with a fixation member from a side opposite to the insulating member.

5. The ion analyzer according to claim 4, wherein a positioning convex part is formed on one of the first flat plate-shaped part of the second ion flow controller and the second conductive member or the insulating member, and a positioning concave part is formed on the other, and the second ion flow controller is positioned by aligning the convex part and the concave part.

6. The ion analyzer according to claim 1, further comprising:
  an ionization probe configured to allow the ions to flow out; and
  an ion introduction tube configured to introduce the ions from a space from which the ions flow out of the ionization probe into a space in which the ions are analyzed,
  wherein the first ion flow controller is a convergence electrode in which an opening surrounding an end part on an inlet side of the ion introduction tube is formed,
  the second ion flow controller is a push electrode disposed at a position facing an end part on an inlet side of the ion introduction tube and the convergence electrode with a nebulization flow of sample droplets from the ionization probe interposed between the push electrode and the end part on the inlet side of the ion introduction tube and the convergence electrode, and
  the first predetermined voltage and the second predetermined voltage are voltages having the same polarity as polarity of the ions, and an absolute value of the second predetermined voltage is larger than an absolute value of the first predetermined voltage.

7. The ion analyzer according to claim 6, wherein the base member is an ionization unit including the ionization probe.

8. The ion analyzer according to claim 6, wherein
  the ion introduction tube is disposed so as to be orthogonal or oblique to a traveling direction of ions flowing out from the ionization probe,
  the convergence electrode is an L-shaped member including a first flat plate-shaped part and a second flat plate-shaped part extending to the first flat plate-shaped part and formed with an opening surrounding an end part on an inlet side of the ion introduction tube, and
  the push electrode is an L-shaped member including a first flat plate-shaped part and a second flat plate-shaped part extending to the first flat plate-shaped part and disposed to face the end part on the inlet side of the ion introduction tube.

9. The ion analyzer according to claim 8, further comprising:
  a third conductive member used in such a manner that the third conductive member is capable of being exchanged for the first conductive member;
  a grounding part provided at a position where the first conductive member is not in contact with the grounding part and the third conductive member is in contact with the grounding part in a state where the grounding part is accommodated in the concave part; and
  a conductive needle attached to the second conductive member and to which the second predetermined voltage is applied,
  wherein an opening into which the needle is inserted is formed in a first flat plate-shaped part of the push electrode, and a tip of the needle is located between the push electrode and the convergence electrode.

10. The ion analyzer according to claim 9, wherein the first conductive member includes a cut part formed at a position of the third conductive member in contact with the grounding part.

\* \* \* \* \*